United States Patent
Mace et al.

(10) Patent No.: US 9,288,258 B2
(45) Date of Patent: Mar. 15, 2016

(54) COMMUNICATION USING INTEGRATED CIRCUIT INTERCONNECT CIRCUITRY (75) Inventors: Timothy Charles Mace, Suffolk (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 357 days.

(21) Appl. No.: 13/825,190

(22) PCT Filed: Oct. 11, 2011

(86) PCT No.: PCT/GB2011/051951
§ 371 (c)(1),
(2), (4) Date: May 3, 2013

(87) PCT Pub. No.: WO2012/049485
PCT Pub. Date: Apr. 19, 2012

(65) Prior Publication Data
US 2013/0219004 A1  Aug. 22, 2013

(30) Foreign Application Priority Data
Oct. 12, 2010  (GB) .................................. 1017145.2

(51) Int. Cl.
| | |
|---|---|
| H04L 29/08 | (2006.01) |
| H04L 12/40 | (2006.01) |
| H04L 12/46 | (2006.01) |
| G06F 15/78 | (2006.01) |
| H04L 12/701 | (2013.01) |

(52) U.S. Cl.
CPC ............ H04L 67/10 (2013.01); G06F 15/7842 (2013.01); H04L 12/40084 (2013.01); H04L 12/46 (2013.01); H04L 45/00 (2013.01)

(58) Field of Classification Search
CPC ....................................................... H04L 47/70
See application file for complete search history.

(56) References Cited

U.S. PATENT DOCUMENTS

| | | | | |
|---|---|---|---|---|
| 6,894,999 | B1 * | 5/2005 | Acharya | 370/352 |
| 8,656,078 | B2 * | 2/2014 | Lim | 710/110 |
| 8,819,310 | B2 * | 8/2014 | Jeong et al. | 710/54 |
| 2003/0140109 | A1 * | 7/2003 | Pospesel et al. | 709/208 |
| 2003/0167365 | A1 * | 9/2003 | Kubalska et al. | 710/113 |
| 2005/0076125 | A1 * | 4/2005 | Weber et al. | 709/227 |
| 2006/0149874 | A1 * | 7/2006 | Ganasan | G06F 13/364 710/110 |

(Continued)

FOREIGN PATENT DOCUMENTS

| | | |
|---|---|---|
| WO | WO 00/33201 | 6/2000 |
| WO | 2 429 613 | 2/2007 |

(Continued)

OTHER PUBLICATIONS

International Preliminary Report on Patentability mailed Apr. 25, 2013 in PCT/GB2011/051951.

(Continued)

Primary Examiner — Lashonda Jacobs
(74) Attorney, Agent, or Firm — Nixon & Vanderhye P.C.

(57) ABSTRACT

An integrated circuit comprising multiple master units and multiple slave units connected via interconnect circuitry utilizes token based node-to-node communication flow management within the interconnect circuitry with a network node requesting a token and receiving a token signal before it asserts its communication signals onto a physical communication link shared between multiple virtual networks.

24 Claims, 8 Drawing Sheets

(56) References Cited

U.S. PATENT DOCUMENTS

| | | | |
|---|---|---|---|
| 2007/0038762 A1* | 2/2007 | Moerdijk | 709/229 |
| 2007/0038782 A1 | 2/2007 | Jones | |
| 2008/0028090 A1* | 1/2008 | Kok et al. | 709/230 |
| 2008/0040523 A1* | 2/2008 | Bruce | G06F 13/364 710/110 |
| 2010/0211935 A1* | 8/2010 | Weber et al. | 717/127 |
| 2011/0264827 A1* | 10/2011 | Kocherry | G06F 13/385 710/15 |
| 2012/0079150 A1* | 3/2012 | Aoki et al. | 710/110 |
| 2012/0290752 A1* | 11/2012 | Lim | G06F 13/4022 710/110 |

FOREIGN PATENT DOCUMENTS

| | | |
|---|---|---|
| WO | WO 2007/122547 | 11/2007 |
| WO | WO 2008/020149 | 2/2008 |

OTHER PUBLICATIONS

International Search Report for PCT/GB2011/051951, mailed Jan. 13, 2012.

UK Search Report for GB Application No. 1017145.2, dated Jan. 31, 2011.

Bjerregaard, T. et al., "Virtual Channel Designs for Guaranteeing Bandwith in Asynchronous Network-on-Chip", Norchip Conference, (Nov. 8-9, 2004), pp. 269-272.

Felicijan, T. et al., "An Asynchronous On-Chip Network Router with Quality-of-Service (QoS) Support", Soc Conference, (Sep. 12, 2004), pp. 274-277.

Dobkin, R. et al., "Credit-Based Communication in NoCs", Introduction to Networks on Chips: VLSI Aspects, (Apr. 24, 2007), 8 pages.

Diemer, J. et al., "Efficient Throughput-Guarantees for Latency-Sensitive Networks-On-Chip", Design Automation Conference, (Jan. 18, 2010), pp. 529-534.

* cited by examiner

COMMUNICATION USING INTEGRATED CIRCUIT INTERCONNECT CIRCUITRY

This application is the U.S. national phase of International Application No. PCT/GB2011/051951, filed 11 Oct. 2011, which designated the U.S. and claims priority to GB Application No. 1017145.2, filed 12 Oct. 2010, the entire contents of each of which are hereby incorporated by reference.

BACKGROUND

This invention relates to the field of integrated circuits. More particularly, this invention relates to communication using interconnect circuitry connected between one or more master units and one or more slave units of an integrated circuit.

It is known to provide integrated circuits with interconnect circuitry connecting master units to slave units. An example of such interconnect circuitry are those built in accordance with the AMBA AXI interface designed by ARM Limited of Cambridge, England.

It is known within the field of data processing systems to utilise token-based communication. Master units that are to generate a communication transaction must possess a token before they are able to issue that communication transaction. This provides a mechanism for dividing the communication resources between different masters. Within such systems it is typical that a number of tokens are allocated to each master in advance and stored and managed within the masters and the slaves. As a way of balancing the utilisation of the communication channels between different masters, such that a high priority master will gain more access to the communication channels than a low priority master, it is known to issue more tokens to the high priority master than to the low priority master. While this is one way of balancing the access to the communication channels, it disadvantageously increases the number of tokens present within the system which must be stored and managed. This produces a disadvantageous increase in the complexity and cost of the system.

SUMMARY

Viewed from one aspect the present invention provides an integrated circuit comprising:

a plurality of master units configured to generate communication transactions;

interconnect circuitry coupled to said plurality of master units and configured to carry said communication transactions; and one or more slave units coupled to said interconnect circuitry and configured to respond to said communication transactions; wherein said interconnect circuitry is configured to provide a plurality of virtual networks, each virtual network connecting at least one of said plurality of master units to at least one of said one or more slave units and including a plurality of network nodes, at least two of said plurality of virtual networks being overlapping virtual networks having an overlapped portion that shares a physical communication link between at least two of said plurality of network nodes; and at least network nodes within said overlapped portion perform node-to-node token based communication flow management whereby:

(i) before asserting communication signals corresponding to a communication transaction with a target slave unit via one of said overlapping virtual networks, at least network nodes within said overlapped portion are configured to assert a token request upon said overlapping virtual network to request a token signal for said overlapping virtual network from a next network node downstream within said overlapping virtual network toward said target slave unit and not to assert said communication signals upon said physical communication link shared with another overlapping virtual network until said token signal is received; and (ii) said next network node receiving said token request blocks return of said token signal until said next network node is ready to receive said communication signals.

This technique utilises a form of node-to-node token based communication flow management within the system but with a reduced overhead of storage and control complexity as nodes within at least the overlapped portion (the portion most needing to manage access via this token based technique) request their token before this is issued to them as a token signal rather than being allocated in advance a set of tokens which then must be provided with appropriate storage and management mechanisms at both the transmitter and receiver ends of communication. The node-to-node token based communication over the overlapping portion reduces the likelihood that the physical communication link is blocked and made unavailable to other virtual networks by a node asserting communication signals upon the physical communication link without the receiving node being able to accept those communication signals and clear the physical communication link for use by other virtual networks.

A network node may determine whether or not it is ready to receive the communication signals in a variety of different ways. These include the network node being able to store in a non-blocking manner the communication signals received within the network node concerned and accordingly clear the physical communication link for use with another overlapping virtual network. Another possibility is that the network node has already received a token signal from a further network node downstream within its overlapping virtual network indicating that that further network node is ready to receive the communication signals and accordingly it is determined that the network node will be able to clear the physical communication link and pass on the communication signals downstream in a manner that will not block the overlapping portion.

The token request signal may be generated by a master unit and then passed along on a node-to-node basis between nodes of the virtual network until it reaches a target slave unit. Network nodes within the overlapping virtual network between the master unit and the target slave unit forward the token request toward the slave unit.

A network node between the master unit and the target slave unit may include storage elements configured to store the communication signals and in this circumstance the network node may respond to receipt of a token request by returning a token signal if the storage elements are available to store the communication signals.

A network node within the overlap portion may conveniently include a plurality of sets of storage elements each dedicated to storing communication signals for respective overlapping virtual networks such that the network signals may be stored in respect of one of the overlapping virtual networks, but the communication signals for this overlapping virtual network will be stored without blocking use of the physical communication link by other of the overlapping virtual networks.

The latency associated with token requests and token signals may be reduced by pipeline processing these token requests and token signals as they are passed between the network nodes such that multiple token requests and token signals may be "in-flight" along the virtual network at any given time.

It will be appreciated that the token request and the token signal can be considered to provide a handshake communication protocol across the communication channels.

A target slave unit within the overlapping virtual network may serve as one of the network nodes and can ultimately be considered to generate the token signal when it is ready to receive the communication signals. This token signal will be passed back along the overlapping virtual network although intermediate nodes may have already pre-emptively passed back token signals if they have storage for buffering the communication signals that is available for use and accordingly available to ensure that the physical communication link does not become blocked.

While the master units and the slave units could take a wide variety of different forms, one example of the use of the present techniques is where a graphics processing unit and a general purpose processor are master units connected by different overlapping virtual networks to a memory controller as a slave device. The token based node-to-node communication management described above is well suited for use in this situation.

The communication signals may have a variety of different forms, such as write requests or read requests. Write requests and read requests may comprise communication of write address signals, write data signals, read address signals, read data signals and write response signals. Each of these sets of signals may be separately transferred using its own token based control over the overlapping virtual networks to ensure that the relevant physical communication links are not blocked for use by other overlapping virtual networks.

If the communication transaction is a write burst request having a plurality of write data beats, then a token request is asserted for each of the write data beats to ensure that no one write data beat blocks the physical communication link.

In order to ensure that the token based management works effectively in response to a sequence of communication transactions, token signals for write data signals are returned in the same order with respect to the sequence as token signals for write address signals.

In order to reduce latency associated with communication, at least one of the plurality of master units may be a token pre-fetching master unit configured to issue a token request before a corresponding communication transaction is ready to issue. In order for such a token-pre-fetching technique to not inappropriately block a virtual network it is ensured that a network node disposed at a position where it may receive a token request from a token-pre-fetching master unit includes at least one set of storage elements dedicated to storing communication signals for that token pre-fetching master unit. Thus, as soon as the token-pre-fetching master unit is ready to issue its communication signals, the node will be able to accept those communication signals into its set of storage elements and accordingly avoid blocking the communication link.

A token-pre-fetching master unit may be limited to pre-fetching a maximum of one token signal to reduce associated control and storage complexity.

The topology of the virtual networks may vary. In some topologies, a plurality of slave units are connected to the overlapping portion. In such embodiments, a final network node within the overlapped portion which is connected to a plurality of slave units may use a memory address associated with the communication channel to route the token request to one of the slave units in accordance with a mapping of the slave units to the memory addresses.

In this context the final network node will serve to issue separate token requests to each of the plurality of slave units to which it is connected and will receive separate token signals from each of these plurality of slave units as they may independently of each other be available or not available to receive a communication transaction and accordingly separate tokens are required for managing communication therewith.

As individual nodes may be carrying multiple communication transactions between multiple masters and slaves, communication efficiency is improved when the communication transactions have an associated priority value and the network nodes within the overlapping portions are responsive to the priority values associated with different communication transactions to arbitrate access to the physical communication link. Thus, if multiple communication transactions are queued for use within a network node, then the communication transactions of highest priority will be given access to the physical communication link first.

It will be appreciated that techniques of multiplexing and demultiplexing of communication channels may be combined with the techniques of token based node-to-node communication flow management described above.

Viewed from a further aspect the present invention provides an integrated circuit comprising:

a plurality of master means for generating communication transactions;

interconnect means for carrying said communication transactions, said interconnect means being coupled to said plurality of master means; and one or more slave means for responding to said communication transactions, said one or more slave means being coupled to said interconnect circuitry; wherein said interconnect means is configured to provide a plurality of virtual networks, each virtual network connecting at least one of said plurality of master means to at least one of said one or more slave means and including a plurality of network nodes, at least two of said plurality of virtual networks being overlapping virtual networks having an overlapped portion that shares a physical communication link between at least two of said plurality of network nodes; and at least network nodes within said overlapped portion perform node-to-node token based communication flow management whereby:

(i) before asserting communication signals corresponding to a communication transaction with a target slave means via one of said overlapping virtual networks, at least network nodes within said overlapped portion are configured to assert a token request upon said overlapping virtual network to request a token signal for said overlapping virtual network from a next network node downstream within said overlapping virtual network toward said target slave means and not to assert said communication signals upon said physical communication link shared with another overlapping virtual network until said token signal is received; and (ii) said next network node receiving said token request blocks return of said token signal until said next network node is ready to receive said communication signals.

Viewed from a further aspect the present invention provides a method of communication using an integrated circuit, said method comprising the steps of:

generating communication transactions with a plurality of master units;

carrying said communication transactions with interconnect circuitry coupled to said plurality of master units; and responding to said communication transactions with one or more slave units coupled to said interconnect circuitry; said method further comprising the steps of:

providing a plurality of virtual networks, each virtual network connecting at least one of said plurality of master units to at least one of said one or more slave units and including a plurality of network nodes, at least two of said plurality of virtual networks being overlapping virtual networks having an overlapped portion that shares a physical communication link between at least two of said plurality of network nodes; and performing node-to-node token based communication flow management whereby:
(i) before asserting communication signals corresponding to a communication transaction with a target slave unit via one of said overlapping virtual networks, at least network nodes within said overlapped portion assert a token request upon said overlapping virtual network to request a token signal for said overlapping virtual network from a next network node downstream within said overlapping virtual network toward said target slave unit and do not assert said communication signals upon said physical communication link shared with another overlapping virtual network until said token signal is received; and
(ii) said next network node receiving said token request blocks return of said token signal until said next network node is ready to receive said communication signals.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
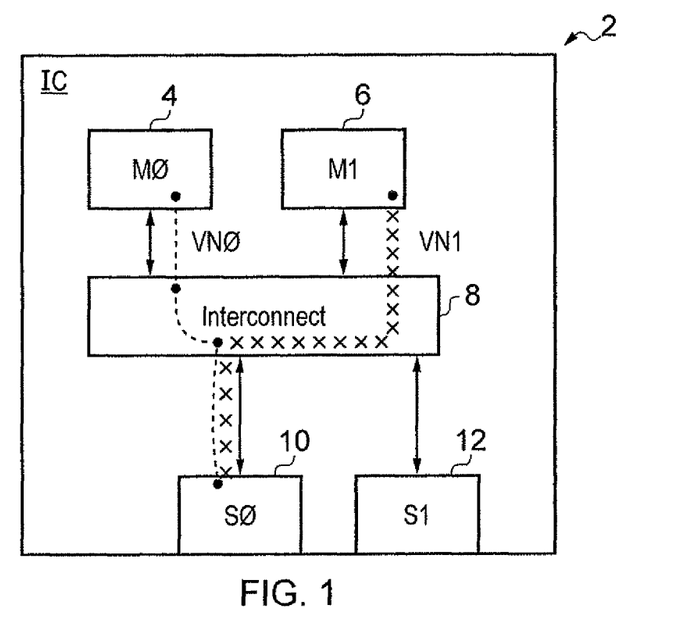
FIG. 1 schematically illustrates an integrated circuit including a plurality of master units, interconnect circuitry and a plurality of slave units.

FIG. 1 schematically illustrates an integrated circuit 2 including a plurality of master units 4, 6 for generating communication transactions for communication via interconnect circuitry 8 to a plurality of slave units 10, 12. The interconnect circuitry 8 provides multiple communication channels including a write address channel, a read address channel and a write data channel passing from the master units 4, 6, to the slave units 10, 12 and a read data channel and a write response channel passing from the slave units 10, 12 to the master units 4, 6. The interfaces of each of the master units 4, 6 and the slave units 10, 12 connected to the interconnect 8 provide these full five communication channels. These communication channels may be configured in accordance with the known AMBA AXI communication mechanisms designed by ARM Limited of Cambridge, England.

Also illustrated within FIG. 1 are two virtual networks VN0 and VN1. These virtual networks including an overlapping portion extending between the interconnect circuitry 8 and the slave unit 10. The virtual networks VN0 and VN1 use token based node-to-node communication flow management techniques described below to address the problems of contention and channel blocking within the overlapped portion of the virtual networks VN0 and VN1 extending between the interconnect circuitry 8 and the slave unit 10.

Figure 2:
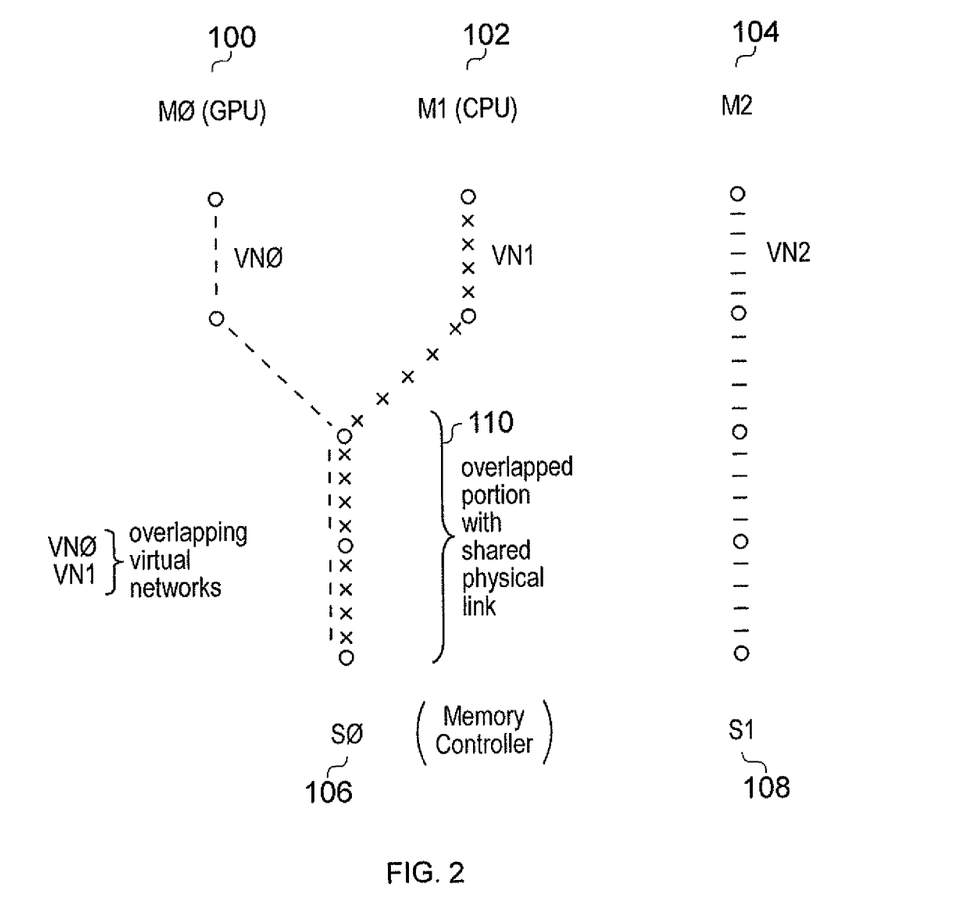
FIG. 2 is a diagram schematically illustrating the topology of communication links within an integrated circuit including overlapping virtual networks.

As illustrated in FIG. 1, multiple virtual networks VN0 and VN1 may be provided through the interconnect circuitry 8. FIG. 2 illustrates an example of a virtual network topology provided between multiple master units 100, 102, 104 and multiple slave units 106, 108. Network nodes indicated by small circles are provided along each of these virtual networks and in this example embodiment correspond to register slices within the interconnect for storing/buffering communication signals as they are transferred.

As illustrated in FIG. 2, the virtual network VN2 between master unit 104 and master unit 108 is a dedicated connection and there will not be any inter-network condition arising on this dedicated virtual network. In contrast, the virtual networks VN0 and VN1 have an overlapped portion using a shared physical communication link 110 connecting to the slave 106. In this example the master unit 100 is a graphics processing unit, the master unit 102 is a general purpose processor and the slave unit 106 is a memory controller.

Each of the virtual networks VN0 and VN1 uses a token based node-to-node communication flow management technique. A network node wishing to pass communication signals first requests a token by generating a token request signal which is passed to the next network node along the virtual network. This network node when it is ready to accept the communication signals and have these cleared without delay from the physical communication link issues a token signal back to the earlier network node to indicate that it may now send the communication signals. The receiving network node will issue the token signal either when it has itself received a token signal from the next following network node and accordingly can determine that it will not itself need to stall the physical communication link as it will be able to pass the communication signals along, or that the network node has storage available into which the communication signals can be stored as soon as they are received even if the next network node along is not yet able to receive those communication signals. In both of these cases, the network node receiving the communication signals issues the token signal when it is able to receive the communication signals without blocking or causing congestion upon the shared physical communication link.

Figure 3:
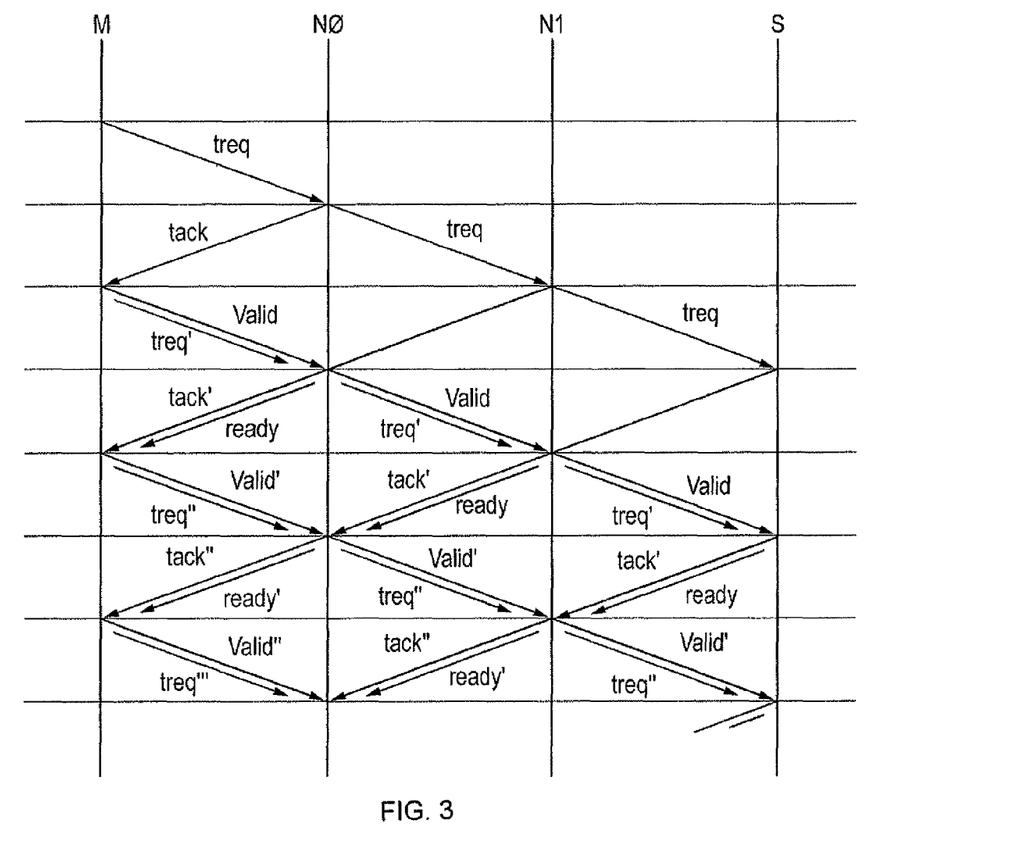
FIG. 3 is a signal diagram schematically illustrating the exchange of token requests, token signals, communication signals and ready signals between nodes of a virtual network.

FIG. 3 illustrates the passing of token request signals treq, token signals tack, communication signals accompanied via a valid signal and an acknowledgement signal indicated by a ready signal between network nodes which include at their origin a master unit and at their destination a slave unit. The passage of the token signals is pipelined between the network nodes. A first token request signal treq is passed to the first network node N0 and acknowledged from the first network node by the token signal tack to indicate that the communication signals can pass from the master unit to the first node N0. At the same time as the token signal tack is being passed back from the first node N0 to the master unit M, the token request signal treq is passed from the node N0 to the second node N1. Thus, the token exchange and then the communication and acknowledgement are pipelined/overlapped between the sequence of stages along the virtual network path.

Figure 4:
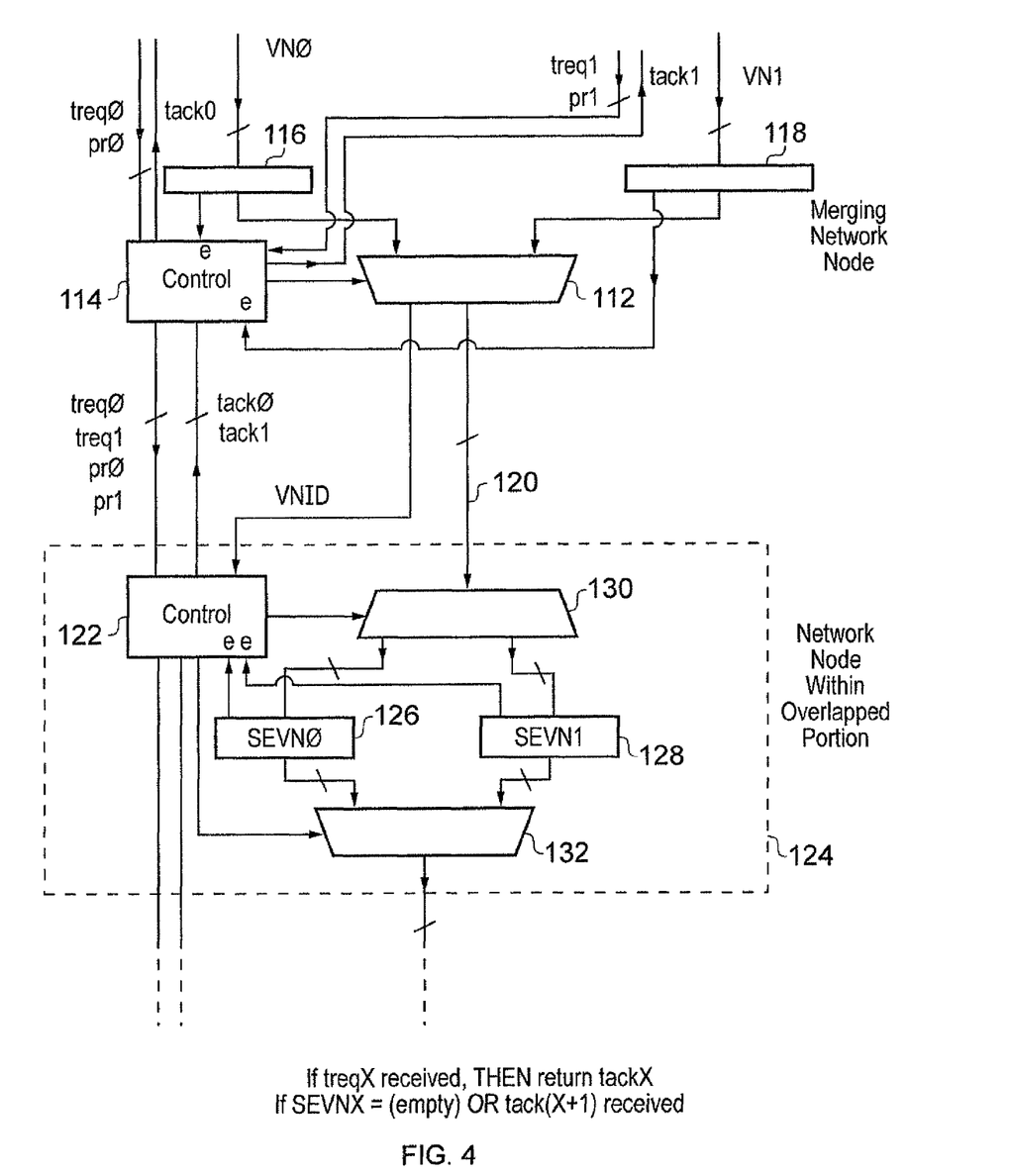
FIG. 4 is a diagram schematically illustrating a merging network node and a network node within an overlapped portion of a system utilising multiple overlapping virtual networks.

FIG. 4 schematically illustrates a merging network node and a network node within an overlapped portion of a virtual network of the type illustrated in FIG. 15. The merging network node includes a multiplexer 112 which selects communication signals received from either a first virtual network VN0 or a second virtual network VN1. Control circuitry 114 controls the multiplexer 112 and is responsive to signals "e" received from storage registers 116, 118 associated with each of the virtual networks indicating whether or not storage space is available within those storage elements 116, 118. The control circuitry 114 is responsive for receiving a token request from the respective virtual networks together with a priority signal and returns a token signal when the merging network node is able to store the communication signals received. The priority signals PR0, PR1 associated with each of the sets of communication signals may be used to arbitrate between these sets of communication signals to determine which will first gain access to the physical communication link 120 when both simultaneously require use of this link.

The control circuitry 114 generates its own token request signals which are passed to control circuitry 122 within a network node 124 of the overlapped portion of the virtual networks. This network node 124 includes storage elements 126 and 128 in respect of each of the virtual networks into which received communication signals can be stored as soon as they are received if the storage elements 126 and 128 are empty. Empty signals e from the storage elements 126, 128 are passed to the control circuitry 122 to indicate whether or not they are empty. The control circuitry 122 controls a demultiplexer 130 to steer the received communication signals from the physical communication link 120. The control circuitry 122 also controls a multiplexer 132 for receiving the communication signals stored within the storage elements 126 and 128 and passing these onto the next network node within the overlapped portion when that following network node is ready to receive the communication signals.

Illustrated at the foot of FIG. 4 is a logical statement indicating when a network node at position X within a virtual network generates a token signal passed back to the preceding network node at position X−1 in dependence upon whether its own appropriate storage element 126, 128 is empty or whether it has received a token signal from the following network node X+1.

Figure 5:
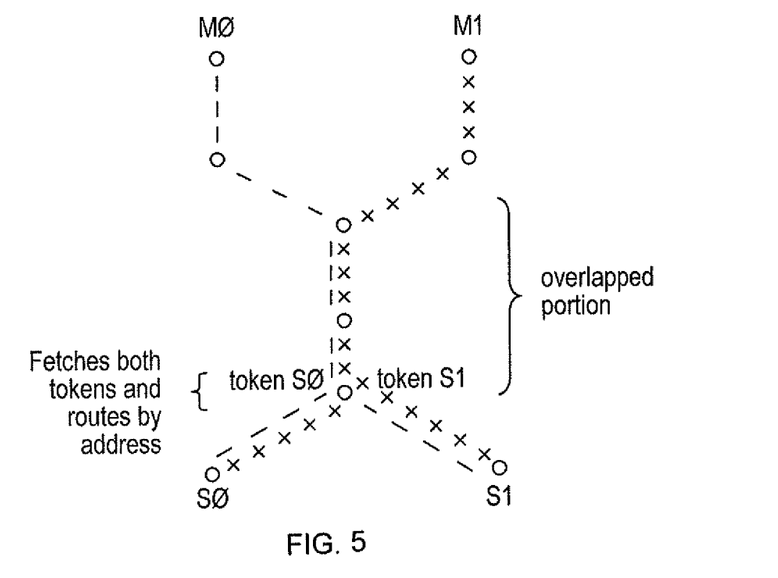
FIG. 5 illustrates a network topology including a final network node within an overlap portion connecting to multiple slave units.

FIG. 5 is a diagram schematically illustrating another network topology including multiple network nodes. In this example, the overlapped portion includes a final network node connected to multiple slave units S0 and S1. The final network node fetches a token from each of these nodes and routes received communication signals according to their associated memory address. Each of the slaves S0 and S1 is mapped to a different region of memory address space. A simple rule for use by the final network node is that it will not issue a token signal to a preceding network node unless it has received tokens from both of the slaves. As an alternative, the final network node may issue a token signal providing it has empty storage in respect of communication signals received for a slave even if it has not yet received a token signal from that slave.

Figure 6:
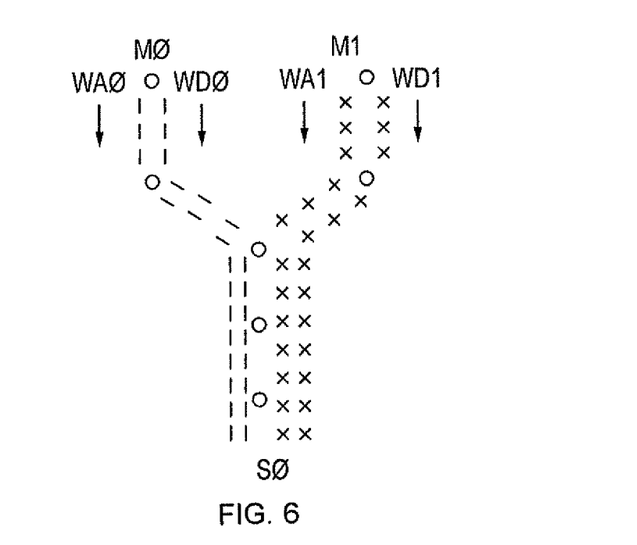
FIG. 6 illustrates a network topology including multiple master units communicating with a slave unit and utilising separate write address and write data channels.

FIG. 6 illustrates another example virtual network topology. In this example the separate write address and write data channels are shown and each of these can be considered to form its own virtual network following the same routing. Each of the write address and write data communication channels can have its own token passing control associated therewith. If the communication transaction is a write burst comprising a plurality of write data beats, then a token request and a token signal will be associated with each beat of the write data. In this context, a sequence of communication transactions is managed such that token signals for the write data signals are returned in the same order with respect to the sequence of transactions as token signals for the write address signals. Thus, the same ordering is preserved and management of the communication eased.

It is possible to provide master units which can pre-fetch a token and are considered to be pre-fetching master units. Such a pre-fetching master unit acts to request a token in advance of transferring a transaction in order to remove the token request/token signal overhead from the eventual transaction latency. When this technique is used, the tokens which are pre-fetched are likely to be unavailable to the system for some time. In order to prevent lock-up in the system from token starvation, the system is configured such that sufficient additional tokens are added to the system through the addition of register slices at the nodes so as to accommodate the maximum number of token pre-fetches. No fetching master unit can fetch more than one token per channel per virtual network. The ability to pre-fetch a token is a configurable parameter of the system and would be determined at design time such that the appropriate storage and register slices can be added to the nodes to accommodate the degree of pre-fetching permitted.

Figure 7:
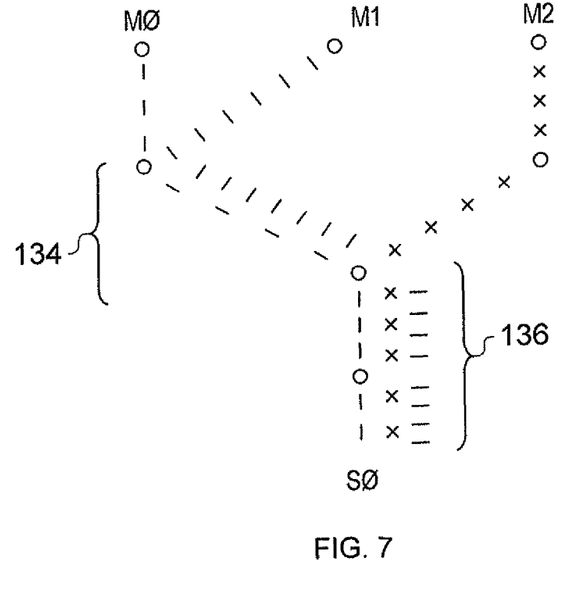
FIG. 7 illustrates a network topology including multiple virtual networks and multiple overlapped portions.

FIG. 7 is a diagram schematically illustrating the topology of another interconnect incorporating multiple virtual networks. In this example it will be seen that there are multiple overlapping portions. In a first overlapping portion 134 two virtual networks overlap. In a second overlapping portion 136 three virtual networks overlap. The token passing of the present technique can be used to handle and manage communication using shared physical links in both of these situations. The use of the shared physical link reduces the conductor count required for joining the different network nodes and accordingly reduces circuit overhead.

Figure 8:
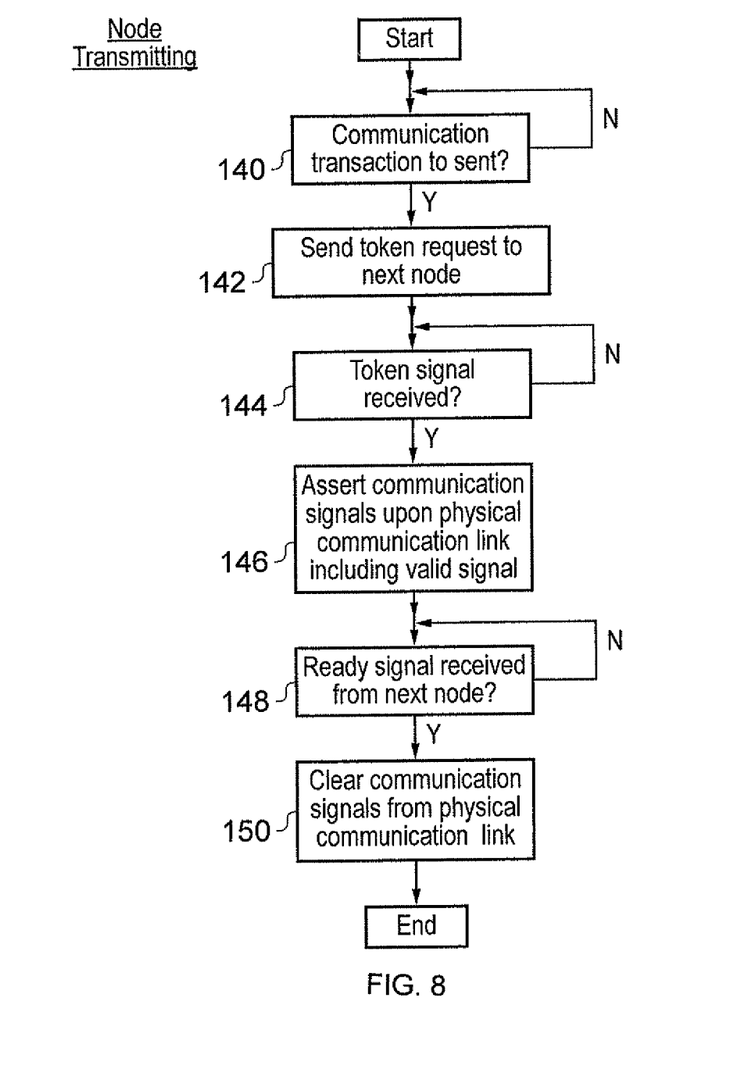
FIG. 8 is a flow diagram schematically illustrating control of transmitting within a node.

FIG. 8 is a flow diagram schematically illustrating the control of the transmitting process at a node. At step 140 processing waits until there is a communication transaction to be sent. At step 142 a token request signal is sent to the next node. At step 144, processing waits until a token signal is received back from the next node. At step 146 the communication signals are asserted upon the physical communication link including asserting a valid signal indicating that the communication signals have been asserted on the physical communication link. At step 148 processing waits until a ready signal is received back from the next node indicating that the communication signal have been received and stored, or otherwise appropriately processed, such as being passing on to the next network node. At step 150 the communication signals are de-asserted from the physical communication link.

Figure 9:
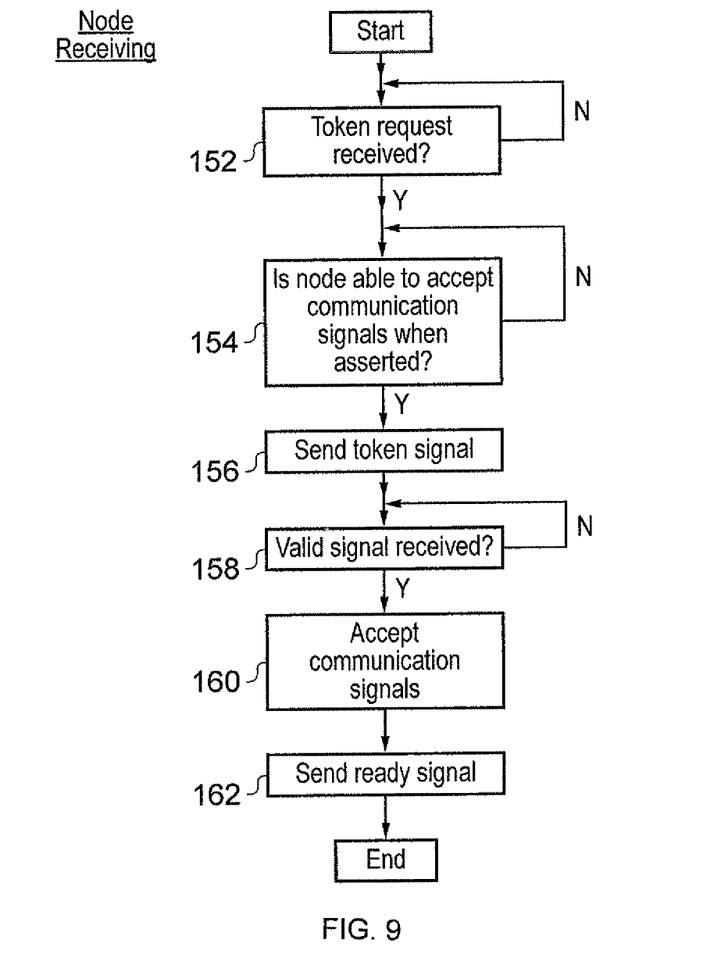
FIG. 9 is a flow diagram schematically illustrating control of receiving within a node.

FIG. 9 is a flow diagram schematically illustrating the control of communication signal reception at a node. At step 152 processing waits until a token request is received. At step 154 processing waits until the node is able to accept the communication signals when these are asserted. This may be because the node has empty storage available for storing those communication signals as soon as they are received, or that the node has already received a token signal from a following node and accordingly the communication signals can be sent to that following node without delay. Step 156 returns the token signal to the node upstream. Step 158 waits until a valid signal is received. When a valid signal is received, step 160 accepts the communication signals from the physical communication link and processes these as described above, such that at step 162 a ready signal may be returned to the preceding node to indicate that the communication signals may be de-asserted and accordingly the physical communication link made available for other use.

Virtual Networks (VNs) enable a communication mechanism such as an AMBA AXI bus interconnect (as designed by ARM Limited of Cambridge, England) to support multiple networks that share links between the nodes in the interconnect topology without blocking between the networks.

VNs offer the ability to address the blocking nature of AXI transactions across a link and give the flexibility to support more effective traffic management techniques (QoS)—quality of service in a system.

The principle uses tokens to indicate that a location exists further through the interconnect topology to accept a transaction before it is presented across a link. Each virtual network has its own tokens which cannot be used by other virtual networks.

Nodes with transactions request a token from the next stage of the system and are granted a token when one is available with a similar handshake mechanism as employed by AMBA AXI. Once the node has a token it is free to present the transaction using the existing AMBA AXI protocol.

Every registered location in the interconnect topology, as well as every outstanding transaction supported by a slave, adds a token to the system. Virtual networks allow the masters of the system to present traffic with similar characteristics onto shared networks so some networks may be congested to regulate those masters but not interfere with latency sensitive traffic such as from a CPU or latency critical traffic such as from an LCD controller.

Signal Descriptions

This section defines the signals used to manage the token transaction through the system Token Request Handshake Signals for the Read Address

| Signal | Source | Description |
| --- | --- | --- |
| ARtVALID | Master | Read address token request valid. This signal indicates that a token is requested to enable the transfer of a read address<br>1 = token requested<br>0 - no token requested<br>This signal must remain asserted until the token is granted and the ARtQV signal must be held constant while asserted. |
| ARtREADY | Slave | Read address token ready. This signal indicates that a token is available from the slave node for the master node.<br>1 = token available for transfer<br>0 = no token available for transfer |
| ARtQV | Master | Read address token priority. These signals indicate the priority of the read address and are used to determine which request the token is provided to in the case where there are multiple requests for the same token. The values supported are from 0 (lowest priority) to 15 (highest priority) |

Token Request Handshake Signals for the Write Address

| Signal | Source | Description |
| --- | --- | --- |
| AWtVALID | Master | Write address token request valid. This signal indicates that a token is requested to enable the transfer of a write address<br>1 = token requested<br>0 - no token requested<br>This signal must remain asserted until the token is granted and the AWtQV signal must be held constant while asserted. |
| AWtREADY | Slave | Write address token ready. This signal indicates that a token is available from the slave node for the master node.<br>1 = token available for transfer<br>0 = no token available for transfer |
| AWtQV | Master | Write address token priority. These signals indicate the priority of the write address and are used to determine which request the token is provided to in the case where there are multiple requests for the same token. The values supported are from 0 (lowest priority) to 15 (highest priority) |

Token Request Handshake Signals for the Write Data

| Signal | Source | Description |
| --- | --- | --- |
| WtVALID | Master | Write data token request valid. This signal indicates that a token is requested to enable the transfer of a write data<br>1 = token requested<br>0 - no token requested<br>This signal must remain asserted until the token is granted |
| WtREADY | Slave | Write data token ready. This signal indicates that a token is available from the slave node for the master node.<br>1 = token available for transfer<br>0 = no token available for transfer |

Token Handshake

This section describes the master/slave token handshake process and outlines the relationship and default values of the READY and VALID handshake signals.

Handshake Process

All three channels use the same handshake process to request and grant tokens. The master asserts VALID to indicate that it needs a token and the slave asserts READY to offer its token to the master. The token is transferred on the rising edge of the clock when both VALID and READY are asserted.

There must be no combinatorial paths between the input and output signals on both the master and slave interfaces.

The timing relationship between the VALID and READY handshake signals is identical to the signals of the same name in the AMBA AXI specification.

Channel Handshake Dependencies

There is no dependency between the token handshake process between the Read Address channel and the other channels.

There is a strong dependency between the Write Address channel token handshake and the Write Data handshake according to the following rules:

1. A node that requests a token for the write address must also request a single token for the write data
2. For a write burst with more than a single beat, the master node must request an additional write data token for each additional write data beat.
3. The write data node channel must offer tokens to the master in the order in which events are observed at the write address node channel where an event is either the issuing of a token for a write address to the acceptance of a write address for a burst of greater than a single beat. This last event may result in the transfer of several tokens which must be completed before processing the next event.

Link Handshake Dependencies

A node must request and receive a token before it can present the AMBA AXI channel transfer.

Nodes can request tokens before the transaction is available. This allows the system to eliminate the effect of the additional latency to the transactions that the process of requesting and accepting token adds.

At an intermediate node in the system, the node can request a token from the next node in the path as soon as it has seen a request for a token from the previous node and has decided that it will grant that request. This gives the intermediate nodes the ability to pipeline the initial two cycle overhead so that the overhead is only experienced once per path rather than once per link.

Token Pre-Fetch

Tokens should be used as soon as they are granted to prevent token starvation in the system. The exception to this rule is where a master wishes to request a token in advance of the transferring a transaction to remove the token request/acknowledge overhead to the transaction latency.

In this case the tokens can be assumed to be unavailable to the system for some time. To prevent lock-up in the system from token starvation, there must be sufficient additional tokens added to the system through the addition of register slices at the nodes to accommodate the maximum possible number of tokens pre-fetches.

No master can pre-fetch more than one token per channel, per virtual network. The ability to pre-fetch a token is a configurable parameter of the system determined at design time.

Token Handshake Routing

If a virtual network supports more than one slave, the network will contain at least one divergent node i.e. a node with more than a single egress link.

There is no routing information support in the token handshake signal set. The node supporting multiple egress links that receives a token request has two options:

1. The node can wait until it receives the transaction address and use this to determine the next link. This mechanism has the disadvantage that the token handshake process cannot be pipelined which has a detrimental impact on transaction latency.
2. The node can request a token from each of the egress links. In this case only one of the tokens will be used by the transaction. The next token request to the node must then only request tokens from the egress links that no longer have a token from the next stage.

The invention claimed is:

1. An integrated circuit comprising:
   a plurality of master units configured to generate communication transactions;
   interconnect circuitry coupled to said plurality of master units and configured to carry said communication transactions; and
   one or more slave units coupled to said interconnect circuitry and configured to respond to said communication transactions; wherein
   said interconnect circuitry is configured to provide a plurality of virtual networks, each virtual network connecting at least one of said plurality of master units to at least one of said one or more slave units and including a plurality of network nodes, at least two of said plurality of virtual networks being overlapping virtual networks having an overlapped portion that shares a physical communication link between at least two of said plurality of network nodes; and
   at least network nodes within said overlapped portion perform node-to-node token based communication flow management whereby:
   (i) before asserting communication signals corresponding to a communication transaction with a target slave unit via one of said overlapping virtual networks, at least network nodes within said overlapped portion are configured to assert a token request upon said overlapping virtual network to request a token signal for said overlapping virtual network from a next network node downstream within said overlapping virtual network toward said target slave unit and not to assert said communication signals upon said physical communication link shared with another overlapping virtual network until said token signal is received; and
   (ii) said next network node receiving said token request blocks return of said token signal until said next network node is ready to receive said communication signals.

2. An integrated circuit as claimed in claim 1, wherein said next network node is ready to receive said communication signals when one of:
   (i) said next network node is able to store said communication signal and to trigger clearing of said communication signals from said overlapped portion such that said physical communication link shared with another overlapping virtual network is made available for further use; and
   (ii) said next network node has received a token signal from a further network node downstream within said overlapping virtual network indicating said further network node is ready to receive said communication signals.

3. An integrated circuit as claimed in claim 1, wherein a master unit within said overlapping virtual network is one of said network nodes and generates said token request.

4. An integrated circuit as claimed in claim 3, wherein a network node within said overlapping virtual network between said master unit and said target slave unit forwards said token request toward said slave unit.

5. An integrated circuit as claimed in claim 1, wherein a network node within said overlapping virtual network between said master unit and said target slave unit includes storage elements configured to store said communication signals, said network node responding to receipt of said token request to return said token signal if said storage elements are available to store said communication signals within said storage elements.

6. An integrated circuit as claimed in claim 5, wherein network nodes within said overlapped portion include a plurality of sets of storage elements each dedicated to storing communication signals for a respective overlapping virtual network.

7. An integrated circuit as claimed in claim 6, wherein token requests and token signals passing between said network nodes within said overlapped portion are pipeline processed.

8. An integrated circuit as claimed in claim 1, wherein said token request and said token signal provide handshake communication control.

9. An integrated circuit as claimed in claim 1, wherein said target slave unit within said overlapping virtual network is one of said network nodes and generates said token signal when ready to receive said communication signals.

10. An integrated circuit as claimed in claim 1, wherein congestion upon one of said overlapping virtual networks that blocks return of said token signal does not block communication via said another overlapping virtual network.

11. An integrated circuit as claimed in claim 1, wherein a graphics processing unit and a general purpose processor are master units connected via different overlapping virtual networks to a memory controller being a slave device.

12. An integrated circuit as claimed in claim 1, comprising respective overlapping virtual networks for carrying write address signals and for carrying write data.

13. An integrated circuit as claimed in claim 12, wherein at least network nodes asserting a token request upon an overlapping virtual network for carrying write address signals also assert a token request upon an overlapping virtual network for carrying corresponding write data signals.

14. An integrated circuit as claimed in claim 13, wherein if said communication transaction is a write burst request having a plurality of write data beats, then a token request is asserted for each of said write data beats.

15. An integrated circuit as claimed in claim 13, wherein in response to a sequence of communication transactions token signals for said write data signals are returned in a same order with respect to said sequence as token signals for said write address signals.

16. An integrated circuit as claimed in claim 1, wherein at least one of said plurality of master units is a token-pre-fetching master unit configured to issue a token request before a corresponding communication transaction is ready to issue, thereby reducing latency associated with said communication transaction.

17. An integrated circuit as claimed in claim 16, wherein a network node configured to receive a token request from a token-pre-fetching master unit includes at least one set of storage elements dedicated to storing communication signals for said token-pre-fetching master unit.

18. An integrated circuit as claimed in claim 17, wherein a token-pre-fetching master unit can pre-fetch a maximum of one token signal.

19. An integrated circuit as claimed in claim 1, comprising a plurality of slave units connected to said overlapped portion.

20. An integrated circuit as claimed in claim 19, wherein a final network node within said overlapped portion and connected to said plurality of slave units uses a memory address associated with said communication transaction to route said token request to one of said slave units mapped to said memory address.

21. An integrated circuit as claimed in claim 20, wherein said final network node issues separate token requests to each of said plurality of slave units an receives separate token signals from each of said plurality of slave units.

22. An integrated circuit as claimed in claim 1, wherein said communication transactions have an associated priority value and network nodes within said overlapped portion are responsive to priority values associated with different communication transactions to arbitrate access to said physical communication link.

23. An integrated circuit comprising:
a plurality of master means for generating communication transactions;
interconnect means for carrying said communication transactions, said interconnect means being coupled to said plurality of master means; and
one or more slave means for responding to said communication transactions, said one or more slave means being coupled to said interconnect circuitry; wherein
said interconnect means is configured to provide a plurality of virtual networks, each virtual network connecting at least one of said plurality of master means to at least one of said one or more slave means and including a plurality of network nodes, at least two of said plurality of virtual networks being overlapping virtual networks having an overlapped portion that shares a physical communication link between at least two of said plurality of network nodes; and
at least network nodes within said overlapped portion perform node-to-node token based communication flow management whereby:
(i) before asserting communication signals corresponding to a communication transaction with a target slave means via one of said overlapping virtual networks, at least network nodes within said overlapped portion are configured to assert a token request upon said overlapping virtual network to request a token signal for said overlapping virtual network from a next network node downstream within said overlapping virtual network toward said target slave means and not to assert said communication signals upon said physical communication link shared with another overlapping virtual network until said token signal is received; and
(ii) said next network node receiving said token request blocks return of said token signal until said next network node is ready to receive said communication signals.

24. A method of communication using an integrated circuit, said method comprising the steps of:
generating communication transactions with a plurality of master units;
carrying said communication transactions with interconnect circuitry coupled to said plurality of master units; and
responding to said communication transactions with one or more slave units coupled to said interconnect circuitry;
said method further comprising the steps of:
providing a plurality of virtual networks, each virtual network connecting at least one of said plurality of master units to at least one of said one or more slave units and including a plurality of network nodes, at least two of said plurality of virtual networks being overlapping virtual networks having an overlapped portion that shares a physical communication link between at least two of said plurality of network nodes; and
performing node-to-node token based communication flow management whereby:
(i) before asserting communication signals corresponding to a communication transaction with a target slave unit via one of said overlapping virtual networks, at least network nodes within said overlapped portion assert a token request upon said overlapping virtual network to request a token signal for said overlapping virtual network from a next network node downstream within said overlapping virtual network toward said target slave unit and do not assert said communication signals upon said physical communication link shared with another overlapping virtual network until said token signal is received; and
(ii) said next network node receiving said token request blocks return of said token signal until said next network node is ready to receive said communication signals.

* * * * *